United States Patent
Mueller (10) Patent No.: US 7,507,344 B2
(45) Date of Patent: *Mar. 24, 2009

(54) METHOD FOR RECYCLING OF OIL BASED DRILLING FLUID CONTAMINATED WITH WATER AND WATER CONTAMINATED WITH OIL BASED DRILLING FLUID

(75) Inventor: Frank Manfred Franz Mueller, Stavango (NO)

(73) Assignee: M-I L.L.C., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/980,927

(22) Filed: Oct. 31, 2007

(65) Prior Publication Data

US 2008/0061003 A1 Mar. 13, 2008

Related U.S. Application Data

(60) Continuation of application No. 11/005,706, filed on Dec. 7, 2004, now Pat. No. 7,300,578, which is a division of application No. 10/295,645, filed on Nov. 15, 2002, now Pat. No. 6,881,349, and a continuation-in-part of application No. 10/132,377, filed on Apr. 24, 2002, now Pat. No. 6,977,048.

(60) Provisional application No. 60/286,236, filed on Apr. 24, 2001.

(51) Int. Cl.
  *B01D 17/04* (2006.01)
(52) U.S. Cl. .................. 210/708; 175/66; 210/712; 210/714; 210/727; 210/728; 210/776; 210/806
(58) Field of Classification Search ................. 210/708
See application file for complete search history.

(56) References Cited

U.S. PATENT DOCUMENTS

| 4,001,114 A | 1/1977 | Joseph et al. ............... 210/44 |
| 4,269,271 A | 5/1981 | Shupe et al. |
| 4,451,377 A | 5/1984 | Luxemburg ............... 210/708 |
| 4,482,459 A | 11/1984 | Shiver ..................... 210/639 |
| 4,595,422 A | 6/1986 | Hill et al. ................... 134/19 |
| 4,599,117 A | 7/1986 | Luxemburg ............... 134/25.1 |
| 5,006,239 A | 4/1991 | Mishra .................... 210/181 |
| 5,164,116 A | 11/1992 | Berkhof et al. ............ 516/179 |

(Continued)

FOREIGN PATENT DOCUMENTS

DE 3830344 A1 3/1989

(Continued)

*Primary Examiner*—Peter A Hruskoci
(74) *Attorney, Agent, or Firm*—Howrey LLP (57) ABSTRACT

A mobile apparatus and method for recycling an invert emulsion based drilling fluid, in which the invert emulsion based drilling fluid includes an oleaginous component and an aqueous component. The apparatus includes an emulsion breaking tank, a water treatment tank, a filter press, and hydrocarbon filters. The method includes: mixing said invert emulsion drilling fluid with a emulsion breaker, wherein the emulsion breaker is a mixture of an alkyl glucoside and an alkane sulfonate; and separating the oleaginous component of the invert emulsion drilling fluid from the aqueous component of the invert emulsion drilling fluid. The method preferably utilizes an emulsion breaker that is a combination of an anionic surfactant, a nonionic surfactant and an alkyl polyglycoside surfactant.

10 Claims, 3 Drawing Sheets

U.S. PATENT DOCUMENTS

| | | |
|---|---|---|
| 5,195,847 A | 3/1993 | Guymon .................. 405/128.7 |
| 5,286,386 A | 2/1994 | Darian et al. ............... 210/639 |
| 5,433,853 A | 7/1995 | Mamone .................... 210/615 |
| 5,759,409 A * | 6/1998 | Knauf et al. ................ 210/708 |
| 5,814,230 A | 9/1998 | Willis et al. ................ 210/710 |
| 5,965,029 A | 10/1999 | Simon et al. ............... 210/663 |
| 6,165,946 A | 12/2000 | Mueller et al. .............. 507/203 |
| 6,267,716 B1 | 7/2001 | Quintero .................... 588/252 |
| 6,382,423 B1 | 5/2002 | Bush et al. .................... 209/3 |
| 6,491,824 B1 | 12/2002 | Lin et al. .................... 210/666 |
| 6,846,420 B2 * | 1/2005 | Reddy et al. ................ 210/710 |
| 6,881,349 B2 * | 4/2005 | Mueller ...................... 210/708 |
| 6,977,048 B2 * | 12/2005 | Mueller et al. .............. 210/708 |

FOREIGN PATENT DOCUMENTS

| | | |
|---|---|---|
| EP | 0787887 A2 | 8/1997 |
| WO | WO96/35040 | 11/1996 |
| WO | WO02/086280 A1 | 10/2002 |

* cited by examiner

METHOD FOR RECYCLING OF OIL BASED DRILLING FLUID CONTAMINATED WITH WATER AND WATER CONTAMINATED WITH OIL BASED DRILLING FLUID

CROSS REFERENCE TO RELATED APPLICATIONS

This application is a continuation of U.S. application Ser. No. 11/005,706, filed Dec. 7, 2004, now U.S. Pat. No. 7,300,578, which is a divisional of Ser. No. 10/295,645 filed Nov. 15, 2002 now U.S. Pat. No. 6,881,349 and a continuation-in-part of Ser. No. 10/132,377 filed Apr. 24, 2002 now U.S. Pat. No. 6,977,048, which claims the benefit of U.S. Provisional Application No. 60/286,236, filed Apr. 24, 2001, the disclosures of which are incorporated herein by reference.

BACKGROUND

Invert emulsion fluids, i.e. emulsions in which the non-oleaginous fluid is the discontinuous phase and the oleaginous fluid is the continuous phase, are employed in drilling processes for the development of oil or gas sources, as well as, in geothermal drilling, water drilling, geoscientific drilling and mine drilling. Specifically, the invert emulsion fluids are conventionally utilized for such purposes as providing stability to the drilled hole, forming a thin filter cake, lubricating the drilling bore and the downhole area and assembly, and penetrating salt beds without sloughing or enlargement of the drilled hole.

Oil-based drilling fluids are generally used in the form of invert emulsion muds. An invert emulsion mud consists of three-phases: an oleaginous phase, a non-oleaginous phase and a finely divided particle phase. Also typically included are emulsifiers and emulsifier systems, weighting agents, fluid loss additives, viscosity regulators and the like, for stabilizing the system as a whole and for establishing the desired performance properties. Full particulars can be found, for example, in the Article by P. A. Boyd et al entitled "New Base Oil Used in Low-Toxicity Oil Muds" in the Journal of Petroleum Technology, 1985, 137 to 142 and in the Article by R. B. Bennet entitled "New Drilling Fluid Technology-Mineral Oil Mud" in Journal of Petroleum Technology, 1984, 975 to 981 and the literature cited therein.

During the drilling process, it is not uncommon for the drilling fluid to encounter a water bearing formation and thus the ratio of oleaginous fluid to non-oleaginous fluid is less than optimal. In some cases, the formation of a difficult to break emulsion occurs and this is often referred to as the "slop". The oil to water ratio in the slop may be 25/75 or 30/70 or similar such numbers. Using conventional methods of emulsion breaking it is possible to recover say a 60/40 ratio of oil to water fluid. This is then diluted with additional make up oil to achieve the desired ratio typically 80/20. One of the primary difficulties with this system is the use of emulsion breakers and surface tension breakers that are not environmentally friendly. That is to say the emulsion breakers and surface tension breakers of the prior art are harmful to aquatic life and thus may not be directly discharged without further treatment or disposal.

Any rig drilling with oil based/synthetic oil based drilling mud is likely producing between 20 to 40 cubic meters per day of slop water, also referred to as waste mud or gray water. The slop water usually may not be directly discharged into the sea because of its hydrocarbon content, which is usually higher than regulatory limits. Therefore the slop water needs to be transported in boat tanks to shore for disposal according to the local regulations. A large portion of this slop water may be classified as special waste.

Thus there exists a continuing need for skid-mounted apparatuses and methods to effectively break emulsions on an offshore rig in an environmental friendly manner thereby reducing the need to transport the slop water onshore.

SUMMARY OF THE INVENTION

The present invention is generally directed to an apparatus and method of recycling drilling fluids or muds that have been contaminated with excess water so as to obtain a materials that is suitable for reuse in the drilling subterranean wells. More particularly, the present invention relates to the separation, on the drilling rig, of the contaminating water from the oleaginous portion of an invert emulsion drilling fluid or mud using a skid-mounted apparatus and a single phase emulsion breaker that is environmentally compatible. The preferred emulsion breaker may include an anionic surfactant, a non-ionic surfactant, and an alkyl polyglycoside, or combinations thereof. The invention may be employed to clean industrial wastewater produced during drilling or shipping operations, including bilge water.

DETAILED DESCRIPTION OF THE INVENTION

The aim of the invention is to recycle slop water into oil based/synthetic oil based drilling mud and clean water. The clean water extracted during this process should be of high enough purity to meet the local regulatory limits for allowing discharge from the rig.

The invention will reduce the transportation of fluid waste in boat tanks to shore, which in turn will (1) reduce the risk of spills; (2) reduce the need for supply boat tank cleaning and with this cost and time; (3) reduce the need for offshore transport and with this a reduction in $CO_2$ production; (4) reduce the risk of a possible halting of drilling operations due to unfavorable weather conditions which prevent a supply boat from docking at a drilling rig coupled with the existing storage capacities on the rig being exhausted; (5) reduce the need of the supply of new drilling mud due to losses; and, (6) will reduce the need of special waste disposal onshore.

The mobile drilling mud recycling unit may consist of one module, or two or more separate modules, either skid mounted or containerized, which can be mobile placed on the drilling rig's deck surface. For two modules, module one will separate the bulk part of the water fraction under use of a chemical reaction from the oil based/synthetic base drilling mud. The oil based mud/synthetic oil based mud will then be transferred back to the shaker house of the rig where it is treated on the rig shaker and directed back into the active mud system. The extracted water is pumped to the second module where it will be treated with a bentonite based flocculent to eliminate/minimize hydrocarbon, organic and heavy metal contamination. The produced treatment sludge (contaminate loaded bentonite flocculent) is directed to a filter press for de-watering and solidification for transport and disposal. The cleaned water phase is pumped over an integrated filter package, which will additionally eliminate hydrocarbon contamination. From there the water can then, after checking that it is within the local regulatory limits, be discharged.

An embodiment of the present invention will now be described by way of example and reference to the accompanying drawings.

Figure 1:
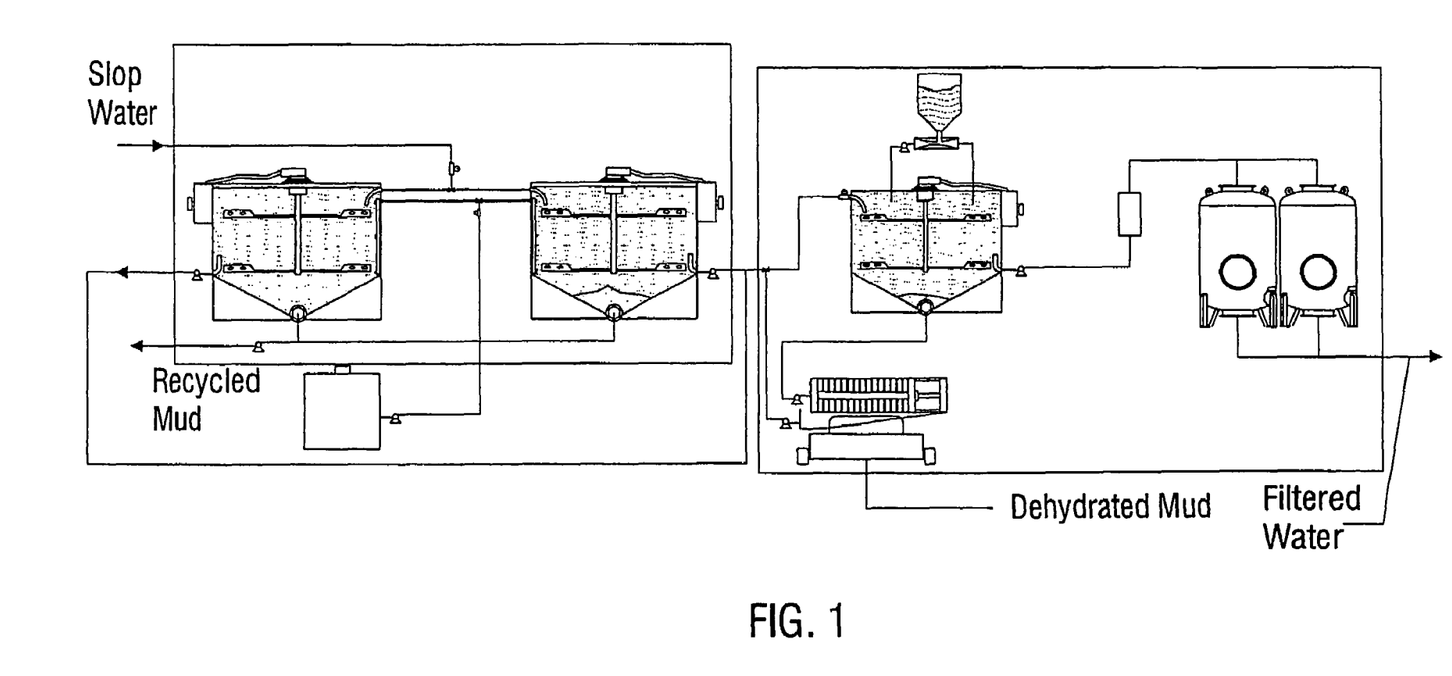
FIG. 1 is a flow diagram of the overall process
Figure 2:
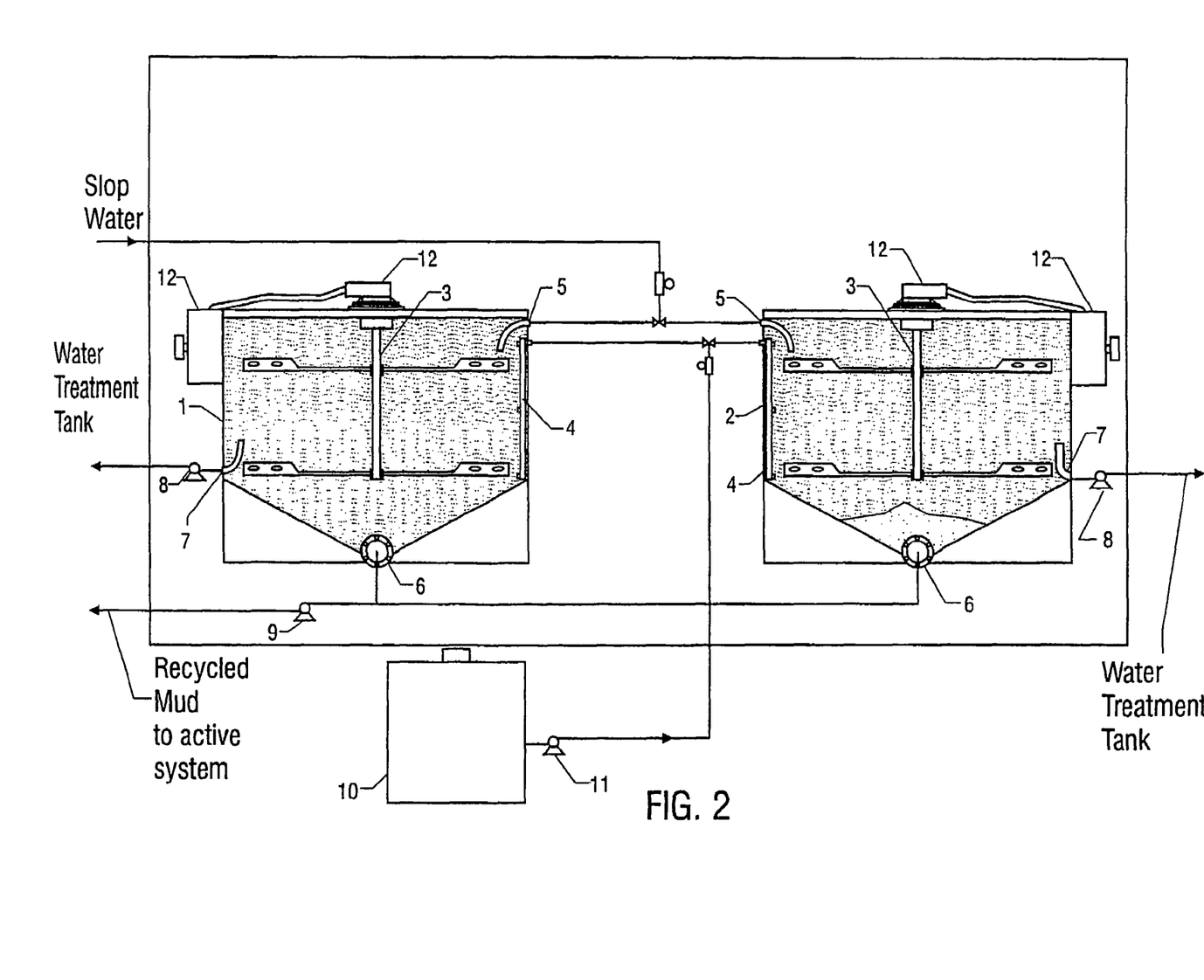
FIG. 2 is a detailed view of the mud recycling operation.

Referring to FIG. 2, typically the slop water is first sent to an emulsion breaking tank 1,2 with agitator 3 and motor 12. An emulsion breaker from a storage tank 10 and pump 11 is added to the tank via a distributor 4 during stirring. After the mud has settled out to the bottom 6 of the tank, the water is skimmed 7 with a pump 8 from the top of the emulsion breaking tank to the top 21 of a water treatment tank 20 on FIG. 3.

Figure 3:
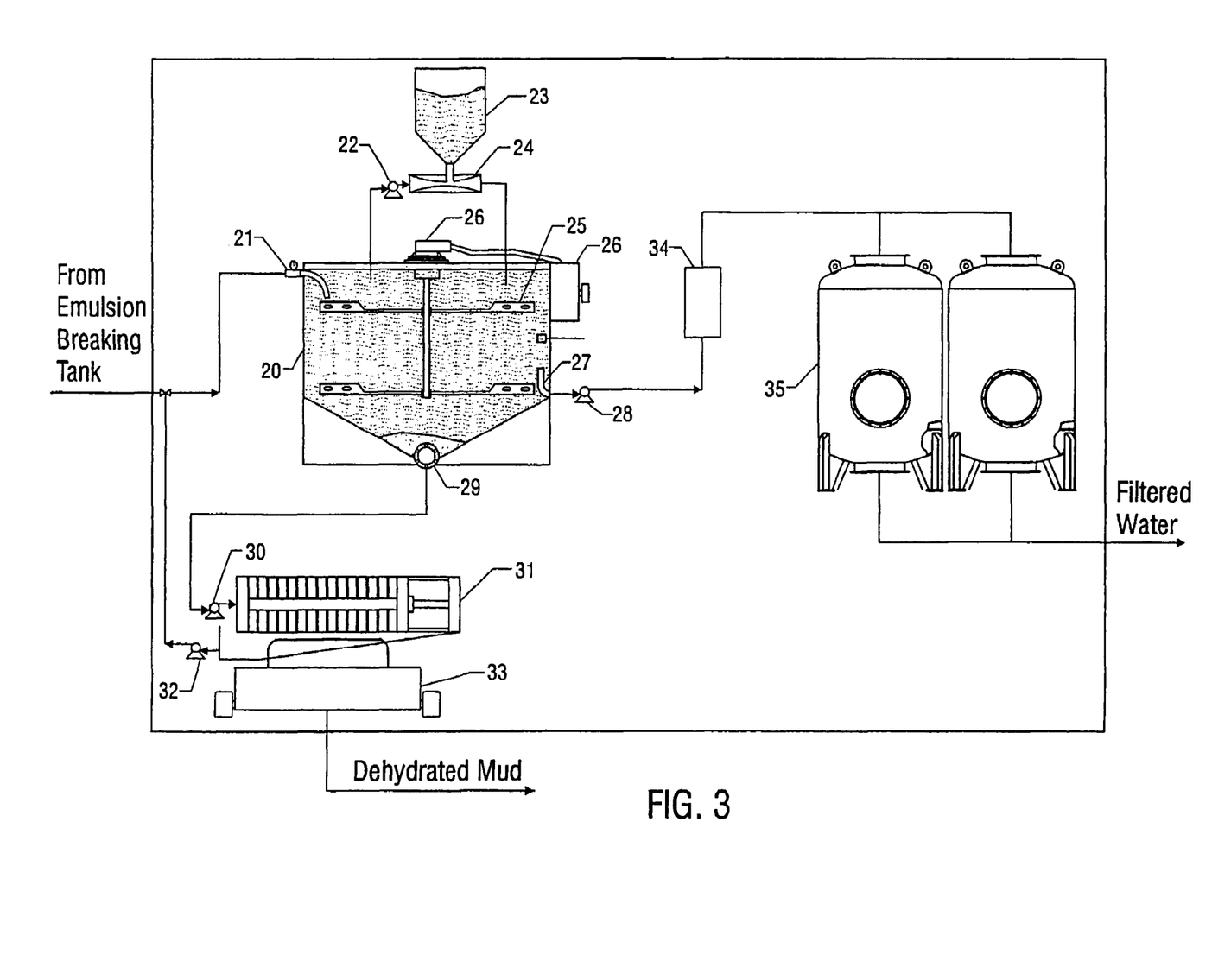
FIG. 3 is a detailed view of the water flocculation tank and filters.

Using the agitator 25 and motor 26, the water treatment tank 20 is vigorously agitated while bentonite based flocculent is added from a venturi powder doser 23 via a venturi nozzle 24 into the water treatment tank 20. A typical dose is between 2 and 4 kilograms per cubic meter of waste water. The usual contaminants in the waste water are hydrocarbons, general organics, and heavy metals. After the bentonite has been wetted, the agitation speed is reduced and the water and bentonite solution is mixed until large, stable bentonite flocculates loaded with the contaminants from the water are observed. The agitation is stopped, and the flocculates are allowed to settle to the bottom of the mixing tank 29. After settling, the water is tapped 27 from the side of the tank above the flocculated material and pumped 28 to a sack filter 34 and a cartridge filter unit 35 for final polishing of any residual hydrocarbons. The produced treatment sludge, which contains contaminate loaded bentonite flocculent 29, is directed or pumped 30 to a filter press 31 for de-watering and solidification, eventually accumulating in a dehydrated mud tank 33 for transport and disposal. The water from the filter press 31 may be pumped 32 back into the water treatment tank 20.

The resulting water typically should have below 20 ppm hydrocarbon contamination and no more than 2 ppm of heavy metals, although final purity is determined by the regulatory limits of a particular location. If the hydrocarbon limits are not met by the polished water, it may be reprocessed in the water treatment system until the correct discharge values are achieved.

The invention also represents a method of separating contaminating water from the oleaginous portion of invert emulsion drilling fluids or muds using the above described apparatus with a phase emulsion breaker that is environmentally compatible. This method allows the fluids or muds to be recycled for reuse in the drilling of subterranean wells at the well itself. The components of the invert emulsion fluids utilized in the method of the present invention generally include an oleaginous liquid such as hydrocarbon oil which serves as a continuous phase, a non-oleaginous liquid such as water or brine solution which serves as a discontinuous phase, and an emulsifying agent. As used herein, emulsifying agent and surfactant are used interchangeably. The emulsifying agent serves to lower the interfacial tension of the liquids so that the non-oleaginous liquid may form a stable dispersion of fine droplets in the oleaginous liquid. A full description of such invert emulsions may be found in *Composition and Properties of Drilling and Completion Fluids,* 5th Edition, H. C. H. Darley, George R. Gray, Gulf Publishing Company, 1988, pp. 328-332, the contents of which are hereby incorporated by reference.

As used herein, the term "invert emulsion" is an emulsion in which a non-oleaginous fluid is the discontinuous phase and an oleaginous fluid is the continuous phase. The novel invert emulsion fluids of the present invention are useful in a similar manner as conventional invert emulsion fluids which includes utility in preparation for drilling, drilling, completing and working over subterranean wells such as oil and gas wells. Such methods of use of conventional inverse emulsion fluids are described in, for example, *Composition and Properties of Drilling and Completion Fluids,* 5th Edition, H. C. H. Darley, George R. Gray, Gulf Publishing Company, 1988, the contents which are incorporated by reference, as well as, U.S. Pat. No. 5,254,531 and EP 271943 which are incorporated by reference. One of skill in the art should know and understand the standard methods of determining if an invert emulsion has been formed. Examples of two such tests for the formation of an invert emulsion include the Invert Emulsion Test as disclosed herein and the measurement of the electrical stability of the invert emulsion.

As used herein the term "oleaginous liquid" means an oil which is a liquid at 25° C. and immiscible with water. Oleaginous liquids typically include substances such as diesel oil, mineral oil, synthetic oil, ester oils, glycerides of fatty acids, aliphatic esters, aliphatic ethers, aliphatic acetals, or other such hydrocarbons and combinations of these fluids. In one illustrative embodiment of this invention the oleaginous liquid is an ester material which provides environmental compatibility to the overall drilling fluid. Such esters are described in greater detail below.

The amount of oleaginous liquid in the invert emulsion fluid may vary depending upon the particular oleaginous fluid used, the particular non-oleaginous fluid used, and the particular application in which the invert emulsion fluid is to be employed. However, generally the amount of oleaginous liquid must be sufficient to form a stable emulsion when utilized as the continuous phase. Typically, the amount of oleaginous liquid is at least about 30, preferably at least about 40, more preferably at least about 50 percent by volume of the total fluid.

As used herein, the term "non-oleaginous liquid" mean any substance which is a liquid at 25° C. and which is not an oleaginous liquid as defined above. Non-oleaginous liquids are immiscible with oleaginous liquids but capable of forming emulsions therewith. Typical non-oleaginous liquids include aqueous substances such as fresh water, sea water, brine containing inorganic or organic dissolved salts, aqueous solutions containing water-miscible organic compounds and mixtures of these. In one illustrative embodiment the non-oleaginous fluid is brine solution including inorganic salts such as calcium halide salts, zinc halide salts, alkali metal halide salts and the like.

The amount of non-oleaginous liquid in the invert emulsion fluid may vary depending upon the particular non-oleaginous fluid used and the particular application in which the invert emulsion fluid is to be employed. Typically, the amount of non-oleaginous liquid is at least about 1, preferably at least about 3, more preferably at least about 5 percent by volume of the total fluid. Correspondingly, the amount should not be so great that it cannot be dispersed in the oleaginous phase. Therefore, typically the amount of non-oleaginous liquid is less than about 90, preferably less than about 80, more preferably less than about 50 percent by volume of the total fluid.

Various surfactants and wetting agents conventionally used in invert emulsion fluids may be incorporated in the fluids of this invention. Such surfactants are, for example, fatty acids, soaps of fatty acids, amido amines, polyamides, polyamines, oleate esters, imidazoline derivatives, oxidized crude tall oil, organic phosphate esters, alkyl aromatic sulfates and sulfonates, as well as, mixtures of the above. Generally, such surfactants are employed in an amount sufficient to form the invert emulsion. However, due to the cost of such agents, a minimal amount o achieve the desired result is typically used.

Viscosifying agents, for example, organophillic clays, may optionally be employed in the invert drilling fluid compositions of the present invention. Usually, other viscosifying agents, such as oil soluble polymers, polyamide resins, polycarboxylic acids and fatty acid soaps may also be employed. The amount of viscosifying agent used in the composition will necessarily vary depending upon the end use of the composition. Usually such viscosifying agents are employed in an amount which is at least about 0.1, preferably at least about 2, more preferably at least about 5 percent by weight to volume of the total fluid. VG-69™ and VG-PLUS™ are orgnoclay materials and Versa HRP™ is a polyamide resin material manufactured and distributed by M-I L.L.C. which are suitable viscosifying agents.

The invert emulsion drilling fluids utilized in the practice of the present invention may optionally contain a weight material. The quantity and nature of the weight material depends upon the desired density and viscosity of the final composition. The preferred weight materials include, but are not limited to, barite, calcite, mullite, gallena, manganese oxides, iron oxides, mixtures of these and the like. The weight material is typically added in order to obtain a drilling fluid density of less than about 24, preferably less than about 21, and most preferably less than about 19.5 pounds per gallon.

Fluid loss control agents such as modified lignite, polymers, oxidized asphalt and gilsonite may also be added to the invert drilling fluids of this invention. Usually such fluid loss control agents are employed in an amount which is at least about 0.1, preferably at least about 1, more preferably at least about 5 percent by weight to volume of the total fluid.

The method of preparing the drilling fluids for use in the present invention is not particularly critical so long as an invert emulsion is formed. Generally, the components may be mixed together in any order under agitation condition in a an emulsion breaking tank 1. A representative method of preparing said invert emulsion fluids comprises mixing an appropriate quantity of oleaginous fluid and an appropriate quantity of surfactant together with continuous, mild agitation. A non-oleaginous fluid is then added while mixing until an invert emulsion is formed. If weight material, such as those described below, are to be added, then the weight material is typically added after the invert emulsion fluid is formed.

Once used in the drilling process, it is not uncommon for the drilling fluid to encounter a water bearing formation and thus the ratio of oleaginous fluid to non-oleaginous fluid is less than optimal. In some cases, the formation of a difficult to break emulsion occurs and this is often referred to as the "slop". The oil to water ratio in the slop may be 25/75 or 30/70 or similar such numbers. Using convention methods of emulsion breaking it is possible to recover say a 60/40 ratio of oil to water fluid. This is then diluted with additional make up oil to achieve the desired ration typically 80/20. One of the primary difficulties with this system is the use of emulsion breakers and surface tension breakers that are not environmentally friendly.

The present invention overcomes these limits by using a combination of alkyl polyglycosides, alkyl sulfonates and alkyl sulfates as the emulsion breaking system. Alkyl polyglycosides are commercially available substances that are produced by acid-catalyzed reaction of glycosides and fatty alcohol. Alkyl polyglycosides are environmentally friendly and are utilized in the personal body care and food industries. Alkyl sulfonates and alkyl sulfates are also commercially available substances which are produced by the alkylation of the sulfate ion with long chain alkyl groups.

The alkyl sulfates of the present invention have the formula:

$$R_1-O-SO_3X$$

where $R_1$ is a linear or branched, saturated or unsaturated $C_{1-22}$ alkyl radical and X is an alkali or ammonium ion.

The alkyl sulfonates of the present invention have the formula:

$$R_2-SO_3Y$$

or $$R_3-SO_3Y$$

where $R_2$ is a $C_{1-18}$ alkyl radical, $R_3$ is a linear or branched, saturated or unsaturated $C_{1-30}$ alkyl radical, and Y is an alkali or ammonium ion.

The nonionic surfactants of the present invention have the formula:

$$R_4-O-(EO)_nH$$

or $$R_4-O-(EO)_mR_5$$

where $R_4$ is a liner or branched, saturated or unsaturated $C_{1-22}$ alkyl radical, $R_5$ is a liner or branched alkyl radical, saturated or unsaturated $C_{1-22}$ alkyl radical, n is a number from 1 to 5. EO is an ethylene oxide radical, propylene oxide radical, or butylene oxide radical or mixture thereof and m is a number from 1 to 50.

The alkyl polyglocosides (also sugar surfactants) of the present invention have the formula:

$$R_6-O-G_n$$

where $R_6$ is a linear or branched, saturated or unsaturated $C_{1-22}$ alkyl radical, G is a glycose unit, and n is a number from 1 to 10.

As presented in the following examples this combination of components is referred to as WIGOL EMD 2+2 available from WIGOL of Worms Germany. Generally the method involves taking the slop material, adding the emulsion breaker (i.e. WIGOL EMD 2+2) and allowing the emulsion to settle out in emulsion breaking tank 1. This may take anywhere from less than about one hour to more than about 14 hours. The water phase is then pumped out using skimmer 7 and pump 8. The oleaginous fluid and desired drilling fluid solids are retained and recycled via pump 9. In practicing the present method any convention method of settling and separation may be used. For quickly separating emulsions a cyclone separator may be used. Otherwise settling tanks or other similar separation devices can be used.

The following examples are included to demonstrate preferred embodiments of of the emulsion breakers of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the scope of the invention.

EXAMPLE 1

The basic test emulsion material utilised the following laboratory tests are drilling fluids as substantially described above with an Oil/Water Ratio (OWR) of approximately 32/68 and OWR 50/50.

|  | Test Fluid | |
| --- | --- | --- |
|  | Slop 31/69 | Slop 50/50 |
| Density (at RT) | 1.21 | 1.18 |
| OWR | 31/69 | 50/50 |
| Dry Material % wt | 10 | 10-15 |

Emulsion Clearance Agent: The emulsion clearance agents of the prior art serve as basis and standard for this test. At the same time it is about an industrial flushing agent based on anionic surfactants (RENAX) and a surfactant raw material based on sugar surfactants (6202), being applied as follows: Renax+Sugar surfactant 6202, Concentration: 2% each, Ratio of mixture: 1:1. A variety of Emulsion Clearance Agents (ECA) were tested as shown below:

| ECA | Wigol Art. No. | PH-Value | Basis |
| --- | --- | --- | --- |
| EMD, | 001355 | 7.5 | Anionic Surfactant |
| EMD 2 + 2, | 001357 | 7.5 | Anionic Surfactant |
|  |  |  | Sugar Surfactant |
| EMD 8.2 |  | 3.0 | Anionic Surfactant |
|  |  |  | Non-ionic Surfactant |
|  |  |  | Sugar Surfactant |
| EMD 8.6 |  | 3.0 | Anionic Surfactant |
|  |  |  | Non-ionic Surfactant |
|  |  |  | Sugar Surfactant |

A measured quantity of process mud (i.e 100 g) was placed into a beaker together with a measured portions of the emulsion clearance agent. The mixture was agitated for one minute at 300 rpm. The separated water layer was decanted after a settling time of several hours.

The composition of the remaining Oil/Water (O/W) emulsion was measured by means of distillation (ROFI). A 50 g sample of the treated drilling mud was added and boiled down to a dry substance. The volume of the separated Oil/Water layer was measured in the distillate.

Test with Slop 50/50

The test results for SLOP 50/50 are presented in Table No. 1. The demulsified quantity of water in the precipitated mud DGW was measured after 2, 4 and 14 hours.

Table No. 1: Tests with Slop 50/50.

| Test No. | Starting weight Slop 50/50 [g] | Emulsion Clearance Agent | Codemulsifier | Amount [g] | Demulcified water [g] 2 h | Demulcified water [g] 4 h | Demulcified water [g] 14 h |
| --- | --- | --- | --- | --- | --- | --- | --- |
| 001 | 100 | RENAX | 6202 | 2 + 2 | 7.9 | 19.6 | 25.6 |
| 002 | 100 | EMD | 6202 | 2 + 2 | 19.5 | 19.5 | 19.8 |
| 003 | 100 | EMD 2 + 2 |  | 4 | 18.4 | 24.6 | 25.0 |
| 004 | 100 | EMD 8.6 |  | 4 | 21.5 | 22.7 | 23.0 |
| 005 | 100 | EMD 8.2 |  | 4 |  |  | 28.0 |

After 14 hours 25 grams of water is separated from both the WIGOL-Formula EMD 2+2 and from the RENAX Formula. One of skill in the art should appreciate that this corresponds to a theoretical OWR of 67/33. Under laboratory conditions, and with 4% additive, one of skill in the art should also appreciate that a very high degree of water precipitation from the emulsion, even if the maximum amount of precipitated water was reached only after 12 to 24 hours. The additive EMD 8.2 showed the highest volume of precipitated water (OWR 70/30). However, the mix was decanted only after the test was finished.

Test with Slop 30/70

The test results for SLOP 30/70 are presented in Table No. 2. The demulsified water of the settled mud DGW and the Oil/Water ratio OWR were measured after 14 hours by means of ROFI.

TABLE 2

Tests with Slop 30/70.

| Test No. | Starting Weight Slop 50/50 [g] | Emulsion Clearance Agent | Codemulsifier | Amount [g] | DGW Demulcified water [g] 14 h | DGW out of 100 g | OWR Oil/Water [vol %] |
|---|---|---|---|---|---|---|---|
| 2.1 | 100 | Renax | 6202 | 2 + 2 | 39.1 | 39 | 55/45 |
| 2.2 | 100 | EMD | 6202 | 2 + 2 | 40.0 | 40 | |
| 2.3 | 100 | EMD 2 + 2 | | 4 | 44.0 | 44 | |
| 2.4 | 100 | EMD 8.6 | | 4 | 44.0 | 44 | |
| 2.5 | 100 | EMD 8.2 | | 4 | 46.6 | 47 | 73/27 |
| 2.6 | 200 | EMD 2 + 2 | | 4 | 90.0 | 45 | |
| 2.7 | 200 | EMD 2 + 2 | | 2 | 96.5 | 48 | 75/25 |
| 2.8 | 200 | EMD 2 + 2 | | 1 | 93.4 | 47 | 73/27 |
| 2.9 | 100 | EMD 8.6 | | 1 | 45.3 | 45 | |
| 2.10 | 100 | EMD 8.2 | | 1 | 46.6 | 47 | 73/27 |

Upon review of the above results, one of skill in the art should appreciate that the EMD 2+2, EMD 8.2, and EMD 8.6, with a concentration of 1-4%, performed better than when compared to the existing standard emulsion breaking agent (RENAX) It should also be appreciated that the use of EMD 2+2 on Slop 30/70 exhibited an increased efficiency of about 35% when compared to the prior art emulsion breaking agent (RENAX). Further it should be noted by one of skill in the art that the highest oil to water ratio obtained during the laboratory test was 75/25. Thus, in relation to the combination RENAX/6202, one can reasonably conclude that the applied quantity of a demulsification agent may be reduced by 50% and still achieve the results of the prior art emulsion breaking agent.

While the apparatuses, compositions and methods of the present invention have been described in terms of illustrative embodiments, it will be apparent to those of skill in the art that variations may be applied to the process described herein without departing from the concept and scope of the invention. All such similar substitutes and modifications apparent to those skilled in the art are deemed to be within the scope and concept of the invention s defined by the following claims.

What is claimed is:

1. A method of cleaning slop water, wherein the slop water comprises a water component emulsified with an oleaginous component, the method comprising:

feeding the slop water and an emulsion breaker into an emulsion breaking tank of an apparatus for recycling drilling fluid, wherein the apparatus for recycling drilling fluid comprises:

the emulsion breaking tank, which comprises an agitator, a means for the addition of the emulsion breaker, a means for the addition of the drilling fluid, and a means for removing at least a portion of a demulsified water;

a water treatment tank, which comprises an agitator, a means for adding the at least portion of demulsified water, a means for adding flocculation materials for producing a treatment water and a treatment sludge, a means for removing the treatment water, wherein the emulsion breaking tank is in fluid connection with the water treatment tank; and hydrocarbon filters for filtering the treatment water, wherein the water treatment tank is in fluid connection with the hydrocarbon filters;

mixing the slop water with the emulsion breaker in the emulsion breaking tank, wherein the emulsion breaker is a mixture of a non-ionic surfactant and an anionic surfactant;

separating the water component of the slop water from the oleaginous component of the slop water;

mixing the water component in the water treatment tank with the flocculation materials to produce a treatment sludge and a treatment water;

skimming the treatment water from the water treatment tank;

passing the treatment water through the hydrocarbon filters; and discharging the treatment water.

2. The method of claim 1, wherein the anionic surfactant is selected from the group consisting of:

an alkyl sulfate with the formula: $R_1$—O—$SO_3X$ where $R_1$ is a linear or branched, saturated or unsaturated $C_{1-22}$ alkyl radical and X is an alkali or ammonium ion; and an alkyl sulfonate with the formula: $R_2$—$SO_3Y$ or $R_3$—$SO_3Y$ where $R_2$ is a $C_{1-18}$ alkyl radical, $R_3$ is a linear or branched, saturated or unsaturated $C_{1-30}$ alkyl radical, and Y is an alkali or ammonium ion; and mixtures thereof.

3. The method of claim 1, wherein the emulsion breaking agent is a combination of an anionic surfactant, a non-ionic surfactant and an alkyl polyglycoside surfactant.

4. The method of claim 3 wherein the alkyl polyglycoside has the formula: $R_6\text{—O-}G_n$ where $R_6$ is a linear or branched, saturated or unsaturated $C_{1-22}$ in alkyl radical, G is a glycose unite, and n is a number from 1 to 10.

5. The method of claim 3, wherein the non-ionic surfactant is selected from the group consisting of:

non-ionic surfactants with the formula: $R_4\text{—O-}(EO)_n H$ where $R_4$ is a linear or branched, saturated or unsaturated $C_{1-22}$ alkyl radical, n is a number from 1 to 5, and EO is an ethylene oxide radical, propylene oxide radical, or butylene oxide radical or mixture thereof; and $$R_4\text{—O-}(EO)_m R_5$$

where $R_4$ is a linear or branched, saturated or unsaturated $C_{1-22}$ alkyl radical, $R_5$ is a linear or branched alkyl radical, saturated or unsaturated $C_{1-22}$ alkyl radical, EO is an ethylene oxide radical, propylene oxide radical, or butylene oxide radical or mixture thereof, and m is a number from 1 to 50, and mixtures thereof.

6. The method of claim 1, wherein the slop water has an oil to water ratio of about 10/90 to about 90/10.

7. The method of claim 1, wherein the slop water further contains a weighting material, the weighting material being selected from the group consisting of: barite, calcite, mullite, galena, manganese oxides, iron oxides, and mixtures of these.

8. The method of claim 1, wherein the oleaginous component of the slop water is selected from the group consisting of: diesel oil, mineral oil, synthetic oil, $C_{10}$-$C_{19}$ alkyl and akylene hydrocarbons, esteroils, glycerides of fatty acids, aliphatic esters, aliphatic ethers, aliphatic acetals, and combinations of these.

9. The method of claim 1, wherein the treatment water is recycled to the water treatment tank until the treatment water has less than 2 parts per million heavy metals.

10. The method of claim 1, wherein the treatment water is recycled to the water treatment tank until the treatment water has less than 20 parts per million hydrocarbons.

* * * * *